Patented Apr. 24, 1945

2,374,404

UNITED STATES PATENT OFFICE 2,374,404

CATALYTIC CONVERSION OF HYDROCARBONS

Jacob Elston Ahlberg, Chicago, Ill., assignor to Universal Oil Products Company, Chicago, Ill., a corporation of Delaware No Drawing. Application January 8, 1940, Serial No. 312,846

3 Claims. (Cl. 260—683)

This invention relates to catalytic material which is useful in carrying out many organic reactions and particularly those involving dehydrogenation of hydrocarbons. More specifically the invention is concerned with granular composited catalytic materials which comprise essentially major proportions of substances having relatively low catalytic activity in reactions involving the loss of hydrogen, and minor amounts of substances having relatively high catalytic activity.

It is frequently desirable to dehydrogenate various types of hydrocarbons to cause unsaturation or render them more unsaturated, the dehydrogenated products being more reactive with various types of reagents and more readily subject to polymerization or condensation reactions. For example, aromatic hydrocarbons may be produced by selectively removing hydrogen from hydroaromatics present in cuts from naphthenic petroleums. This generally increases the antiknock value of distillates of the motor fuel boiling range. In the case of the fixed gases obtained in the cracking of hydrocarbons, the gases may be subjected to polymerization treatment whereby olefins present in the cracked gas are polymerized, and the residual gas is of a paraffinic nature and consists mainly of ethane, propane and butanes. These may be subjected to dehydrogenation treatment to produce olefins for further polymerizing treatment. Paraffin hydrocarbons, for example those containing 2 or more carbon atoms in straight chain arrangement may be progressively dehydrogenated. The first step involves the formation of mono-olefins predominantly. These, on further dehydrogenation treatment may be reduced to large yields of di-olefins such as butadiene, isoprene, etc. in the case of $C_4$ hydrocarbons. In many cases hydrocarbons present in oil undergoing treatment are of such a composition and structure that ring formation occurs as illustrated by the formation of toluene from n-heptane, naphthalene from n-butyl benzene and a multiplicity of other possibilities.

In one specific embodiment the present invention comprises a process for stabilizing catalysts useful in dehydrogenation reactions which consists in intimately associating an oxide of zirconium with mixtures of aluminum and chromium oxides whereby a catalytic material is formed which undergoes crystallization less readily at the high temperatures used while processing with and regenerating of the catalytic material.

A large amount of work has been carried on with reactions involving the dehydrogenation of hydrocarbons in the presence of catalysts consisting essentially of mixtures of alumina with an oxide of chromium which show the outstanding value of this material with respect to its activity and selectivity in promoting the desired reactions. These catalysts, however, gradually lose their catalytic effectiveness during the treatment of hydrocarbons not only as a result of the gradual deposition of hydrocarbonaceous materials produced in secondary reactions which reduces the amount of active surface, but also because they undergo a gradual crystallization to an inactive form. The general practice is to process a given hydrocarbon charge in the presence of these catalysts for a limited period of time corresponding to a useful period of catalytic activity and then reactivate the catalyst by oxidation of carbonaceous material with an oxygen-containing gas such as air, for example, or combustion gases containing various proportions of oxygen. In commercial size catalytic units there is more or less local overheating, particularly during the reactivating periods and in order to minimize the time of the regeneration it is desirable to carry out the reactivation at the maximum temperature permissible without ruining or decreasing too rapidly the inherent activity of the catalyst.

The present invention comprises an improvement in the alumina-chromia catalyst whereby the structure is stabilized and crystallization of the chromic oxide is substantially prevented presumably by the formation of double oxides which are resistant to the high temperatures more generally employed in the reactivation periods. Apparently, the zirconia acts to prevent fluxing or sintering of the active catalytic material thus preventing shrinkage and loss of porosity. It may be found by crystallographic examination that the zirconia forms double oxides as referred to above and that these double compounds act both as binders and spacers of a very highly refractory nature which prevent the reduction of surface by fluxing or sintering. The amount of zirconia necessary for stabilization will vary more or less with the ratio of alumina to chromia, the method of preparation and other factors but in general, the amount used may be within the range of approximately 1 to 15% by weight of the composite. Higher percentages may be employed in some cases, however, without reducing the activity of the catalyst.

In the preparation of these catalysts aluminum oxide may be considered as the basic catalytic material or carrier. Aluminum oxide either hydrated or anhydrous exists in a large variety of modifications. The minerals hydrargillite and gibbsite have the general formula $Al_2O_3.3H_2O$ in common; bauxite has the general formula $$Al_2O_3.2H_2O$$ 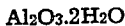

and the minerals diaspore and Böhmite have the general formula $Al_2O_3.H_2O$. The substantially anhydrous oxide $Al_2O_3$ occurs in the form of corundum, alpha alumina, beta alumina and gamma alumina. Each of these modifications has a different crystalline structure, a different specific gravity, and various stabilities at various temperatures. Further modifications of aluminum oxide are produced when aluminum hydroxide is precipitated from solutions of aluminum salts and these are dehydrated at varying temperature levels.

The various forms of aluminum oxide produced by the calcination of naturally hydrated minerals and hydrated precipitates have been employed to a great extent as catalysts and catalyst carriers. Experience has indicated that some forms are considerably better than others but owing to the largely empirical state of the art involving catalysts and catalytic reactions generally, comparatively little is known as to the relative merits of the different forms of aluminum oxide in different types of catalytic reactions.

Gamma-alumina which is a particularly good variety for use in the manufacture of alumina-chromia catalysts may be formed by ignition of crystalline aluminum ortho-hydroxide having the formula $Al_2O_3.3H_2O$ or $Al(OH)_3$ at temperatures above 250° C. but preferably not above 350-500° C. until a substantial equilibrium is established corresponding to the removal of substantially all of the water and the formation of crystals falling within the regular or cubic classification. The oxide thus formed is stable up to temperatures of approximately 950-1000° C. at which point it is converted to the alpha modification which corresponds in crystal structure to the natural mineral corundum, $Al_2O_3$. Gamma aluminum oxide may also be produced by heating the monohydrate, $Al_2O_3.H_2O$, known as Böhmite. It apparently cannot be produced however by heating the material of exactly the same composition known as diaspore, a naturally occurring aluminum mineral.

The element chromium has several oxides, the four best known having the formulas, $CrO$, $Cr_2O_3$, $Cr_3O_4$, and $CrO_3$. The sesquioxide $Cr_2O_3$ is readily produced by heating salts of chromium or the trioxide in hydrogen or hydrocarbon vapors at temperatures above 300° C. The dioxide (chromic chromate) has been considered to be an equimolecular mixture of the trioxide and the sesquioxide. The oxides are readily developed on the surface and in the pores of activated alumina granules by utilizing primarily solutions of chromic acid, $H_2CrO_4$ or chromic nitrate, $Cr(NO_3)_3$. Ignition of the chromic acid, the nitrate, or a precipitated trihydroxide produces primarily the trioxide which is then reduced by any suitable means to the sesquioxide to furnish active catalytic material for use in dehydrogenating reactions. The chromium component may constitute 2 to 20% or more of the finished catalyst.

Several different methods may be employed to produce the refractory catalyst of the present invention although not necessarily with equivalent results. In one method, for example, alumina granules preferably of the so-called activated variety made by controlled calcination of the natural hydrated aluminum oxides, or precipitated aluminum hydroxide are saturated with solutions of salts of zirconium and trivalent chromium such as chromium chloride and zirconyl chloride. These salts are preferably employed in a relatively concentrated solution in amounts to give the required proportions of zirconium oxide and chromium trioxide, and the granules are then dried at approximately 100° C. Variations of the procedure are possible such as saturating the activated alumina with a solution of soluble chromium compounds such as salts or chromic acid for example before or after addition of the soluble zirconium compounds. Instead of using activated alumina, aluminum hydrate may be used and various methods of depositing the active chromium ingredient and stabilizing zirconium compound may be employed including coprecipitation procedures.

After drying the catalyst preparation, the procedure may be varied depending upon the manner in which the catalyst is to be contacted with the organic compounds undergoing reaction and the character of the organic reaction. For example the dried granules may be employed directly in dehydrogenation reactions or they may be calcined at high temperatures prior to their use. Probably in most cases the impregnated alumina is formed into shaped particles so as to be suitable for use as beds of catalyst for alternate use and regeneration in situ. In some cases the aluminum component for example may be preformed into shaped particles and then impregnated as described above.

In the formation of the shaped particles of the catalysts, a pilling operation is frequently used wherein the powdered material is formed into pellets by a series of dies and punches, various lubricants being employed to prevent sticking in the machines. These lubricants may consist of graphite, metal soaps such as for example aluminum and other metal stearates, hydrogenated vegetable oils, etc., the amounts of the lubricants being more frequently less than 10% by weight of the composite. The lubricant has substantially no influence upon the activity of the catalyst. It appears also that the addition of the zirconium stabilizing agent improves the pilling operation by increasing the crushing strength of the pellets above the crushing strength obtained when using alumina-chromia without the added stabilizing agent.

When the catalytic material is employed in hydrocarbon dehydrogenating reactions the temperatures usually employed are in the approximate range of 450-750° C. In regeneration of the catalyst to remove carbonaceous deposits by the use of oxidizing gases, relatively high temperatures of the order of 750° C. or higher are employed which may cause the formation of double compounds and prevent the deterioration of the catalyst structure by crystallization of the chromic oxides as previously described. At temperatures employed in processing, the original chromic oxide is partly decomposed to chromium sesquioxide and partly reduced by the action of the hydrocarbon. It is preferable in some cases to calcine the dried material before contacting with the hydrocarbons at temperatures of the order of 900-1000° C. for several hours depending in part upon the size of the particles and the composition of the catalytic material whereby the stabilized form of the catalyst is believed to be formed.

Composite catalysts of the present character are usually best employed in sizes corresponding to approximately 4–20 mesh which are used as filler in reaction tubes. The type of reactor best suited to a particular reaction will depend to a large extent upon the amount and character of heat involved, that is the extent to which the particular dehydrogenating reaction is endothermic. In the case of the dehydrogenation of hydrocarbons to produce primary reaction products corresponding to a loss of one molecule of hydrogen, it is usually most advantageous to employ low time factors, and the granular catalysts are usually best employed in relatively short tubes which are arranged in parallel between distributing headers, the tubes themselves being surrounded by evaporating or circulating fluids which tend to extract or add heat and maintain a relatively constant temperature. In case longer time factors are required as in reactions corresponding to more extensive dehydrogenation and dehydrocyclization, longer tubes may be employed or the units may be used in series.

When the present type of catalysts are employed under proper conditions of temperature, pressure, and rates of flow of organic compounds they possess a relatively long life before their activity diminishes to any appreciable extent. When, however, they become depreciated to an undesirable extent due to gradual deposition of carbonaceous materials, their activity is readily restored by oxidation with air or other oxidizing gas mixture at moderately elevated temperature of the order of 500° C. which effectively removes carbon and tars which contaminate the surfaces of the particles and decrease their efficiency. It is characteristic of the present types of catalysts that they may be repeatedly reactivated without material loss of catalytic efficiency, and that higher temperatures may be employed to hasten the reactivation without fear of changing their structure.

The following illustrative data are given to show the improved character of the present type of catalysts over those alumina-chromia catalysts previously known in the art although the data are not to be considered as imposing undue limitations upon the scope of the invention as hereinbefore stated.

Two catalysts of the composition 12% $Cr_2O_3$, 87% $Al_2O_3$, 1% $ZrO_2$ and 12% $Cr_2O_3$, 83% $Al_2O_3$, 5% $ZrO_2$ were prepared as follows: The powdered activated alumina was saturated with solutions of zirconium nitrate in such concentration as to subsequently form zirconia on the catalysts in the portions above indicated. The material was practically dried and the dried material then impregnated with chromic acid solution in a corresponding manner. After drying, the powder was admixed with a small amount of lubricant and formed into ⅛ inch by ⅛ inch cylindrical pellets. A portion of these pellets was subjected to hydrocarbon reactions without further treatment, while another portion was calcined at 10 hours at 1000° C. before contacting with the hydrocarbons. Samples of these catalysts and a catalyst containing 88% $Al_2O_3$ and 12% $Cr_2O_3$ were then individually contacted with normal butane for dehydrogenation at a temperature of approximately 600° C. The activity of the catalysts is expressed in terms of the percentage of olefin hydrocarbons present (mostly butanes), in the exit gases from each run. The results are tabulated below:

| Catalyst composition, per cent by weight | Activities | | | |
|---|---|---|---|---|
| | Uncalcined | | Calcined | |
| | $C_2$ | $C_3+$ | 10 hrs. $C_3$ | 1000 C. $C_3+$ |
| 12% $Cr_2O_3$, 88% $Al_2O_3$ | 0.7 | 24.7 | 2.4 | 13.4 |
| 12% $Cr_2O_3$, 87% $Al_2O_3$, 1% $ZrO_2$ | 0.9 | 24.0 | 2.1 | 16.0 |
| 12% $Cr_2O_3$, 83% $Al_2O_3$, 5% $ZrO_2$ | 0.4 | 21.0 | 2.4 | 19.0 |

It is apparent from the above results that with the addition of zirconia there has been only a small decrease in initial activity whereas in the calcined catalyst, the activities of the zirconia-containing catalysts are much higher than the corresponding activity for the alumina-chromia catalyst not treated according to the present invention. This shows the improved heat stability of the catalyst which was heated to much higher temperatures than are ordinarily used in regeneration treatment and is direct evidence of the improved results that may be obtained in the regular use of the improved catalyst of this invention.

I claim as my invention:

1. A process for dehydrogenating hydrocarbons which comprises subjecting the hydrocarbons to dehydrogenating conditions in the presence of a dehydrogenating catalyst comprising a major proportion of alumina and minor proportions of chromia and zirconium oxide.

2. A hydrocarbon dehydrogenating catalyst comprising a major proportion of alumina and minor proportions of chromium oxide and zirconium oxide.

3. The catalyst as defined in claim 2 further characterized in that the chromium oxide is in greater amount than the zirconium oxide.

JACOB ELSTON AHLBERG.